US006893699B2

United States Patent
Ito et al.

(10) Patent No.: US 6,893,699 B2
(45) Date of Patent: May 17, 2005

(54) PROTECTIVE AGENT FOR PRINTED MATTER AND PROTECTION LAYER FORMING METHOD

(75) Inventors: Tomoaki Ito, Osaka (JP); Norio Taniyama, Osaka (JP)

(73) Assignee: Orient Instrument Computer Co., Ltd., Osaka (JP)

( * ) Notice: Subject to any disclaimer, the term of this patent is extended or adjusted under 35 U.S.C. 154(b) by 231 days.

(21) Appl. No.: 10/312,861

(22) PCT Filed: Jul. 6, 2001

(86) PCT No.: PCT/JP01/05895

§ 371 (c)(1),
(2), (4) Date: Jan. 2, 2003

(87) PCT Pub. No.: WO02/04224

PCT Pub. Date: Jan. 17, 2002

(65) Prior Publication Data

US 2003/0152754 A1 Aug. 14, 2003

(30) Foreign Application Priority Data

Jul. 7, 2000 (JP) .......................... 2000-206785
Dec. 1, 2000 (JP) .......................... 2000-367309

(51) Int. Cl.[7] ................................. B32B 3/02
(52) U.S. Cl. .................. 428/64.1; 428/64.4; 428/64.8; 428/402; 430/270.11
(58) Field of Search ............... 428/64.1, 64.4, 428/64.8, 402, 913; 430/270.11, 495.1, 945

(56) References Cited

U.S. PATENT DOCUMENTS

| | | | |
|---|---|---|---|
| 4,525,499 A | * | 6/1985 | Hayashi et al. ............. 523/523 |
| 5,573,831 A | * | 11/1996 | Suzuki et al. ............... 428/64.1 |
| 5,972,457 A | * | 10/1999 | Matsuishi et al. .......... 428/64.1 |
| 6,376,160 B1 | * | 4/2002 | Wang et al. ................. 430/350 |
| 2002/0058111 A1 | * | 5/2002 | Debikey et al. ........... 427/385.5 |
| 2004/0101660 A1 | * | 5/2004 | Kaieda et al. ............. 428/195.1 |

FOREIGN PATENT DOCUMENTS

| | | |
|---|---|---|
| JP | 62275781 A | 11/1987 |
| JP | 10217655 A | 8/1998 |
| JP | 10287060 A | 10/1998 |

* cited by examiner

Primary Examiner—Elizabeth Mulvaney
(74) Attorney, Agent, or Firm—Watchstone P&D; Stephen B. Parker

(57) ABSTRACT

A protective agent for protecting a print formed on a printing object comprises a high-volatile organic solvent as a dispersion medium and non-water family high polymer emulsion liquid including synthetic resin particles as a dispersoid. This protective agent is sprayed onto a print formed on a printing object by a spray method and then dried. For example, an oil-based first print layer 2 is formed on a surface of an information record member 1, an oil-based second print layer 3 is formed on at least a part of the upper surface of the first print layer 2, and the aforementioned protective agent is applied on the upper surface of the second print layer 3 and dried to form a protective layer 4. Thus, the print will not disappeared even if a hands touches or water is adhered, and no bad influence will be given to the substrate material since the protective agent is excellent in quick-drying property.

8 Claims, 1 Drawing Sheet

PROTECTIVE AGENT FOR PRINTED MATTER AND PROTECTION LAYER FORMING METHOD

TECHNICAL FIELD

The present invention relates to a protective agent for protecting a print (printed ink) formed on a surface of a printing object including an optical disk such as a CD (compact disk) or a card-shaped optical disk and a normal paper. It also relates to a method of forming a protective layer for the print and an information storage medium having a print protective layer formed by the protective agent.

BACKGROUND ART

A print showing letters, numbers, figures and the like is normally formed on a surface of a printing object such as a CD (compact disk), a CD-R (recordable CD) or a normal paper with water-based ink by an ink-jet printing method or the like.

However, since the aforementioned print is formed by printing with water-based ink, when the surface of the print gets wet with water, the water-based ink flows easily, causing illegible letters, numbers, figures, etc. and disappearance thereof.

As a method for improving the water resisting property of such a water-based ink print, there is a method in which resin solution including organic solvent and synthetic resin dissolved therein is applied to the surface of the print by a bar coater or the like and then dried to thereby form a protective coat thereon. However, the method had a drawback that the drying rate of the solvent was slow. Furthermore, the water resisting property was insufficient, and therefore the further improvement of the water resisting property was required. That is, although the print may not be completely disappeared, the print tends to become blurry or illegible.

In some CD-Rs, a commercially available print seal is adhered on an upper surface of a CD-R via an adhesive layer of the print seal and a print is formed on the seal with water-based ink. In this case, there are drawbacks that the water resisting property is insufficient and that the adhesive contained in the adhesive layer permeates the information storage medium as a substrate material and finally reaches the recording layer as the core of the information storage medium, which causes disappearance of the recorded information.

On the other hand, in a magnetic-stripe card used as a credit card, a cash card or the like, it is common that the card is embossed with personal information such as an individual name and a registration number so that the information protrudes on the card surface. However, in a recently proposed notable card-shaped optical disk having the same size as that of a card such as a credit card or a business card, a recording layer is formed on approximately the entire surface of the disk. Therefore, it is impossible to employ the aforementioned embossing processing in order to form the aforementioned personal information on the optical disk. Furthermore, in a conventional card with embossed portions showing personal information such as an individual name or a registration number, there is a problem that the embossed portions become bulky when a plurality of cards are stored in a wallet, a card case or the like in piles. Thus, the inventors tried to print personal information such as an individual name or a registration number with oil-based ink on a first printed layer of oil-based ink formed on a surface of a card-type optical disk by a sublimation hot-printing method or the like. This revealed that there was the following problem. Although the information was clearly printed, the print was not fixed well on the first printed layer of oil-based ink and therefore the print was easily disappeared when the print was touched or rubbed with a hand.

The present invention was made in view of the aforementioned technical background. The present invention aims to provide a protective agent for a print capable of effectively preventing the print from wearing off and excellent in quick-drying property and therefore the solvent does not reach a substrate material (printing object) on which the print is formed, which in turn can prevent bad influence on the substrate material. The present invention also aims to provide a method of forming a protective layer for the print and an information storage medium with a well-fixed print that does not become bulky even if they are stored in piles.

Other objects of the present invention will be apparent from the following embodiments.

DISCLOSURE OF INVENTION

In order to attain the aforementioned objects of the present invention, the present inventors have studied diligently. As a result, the inventors have found the facts that forming a protective layer on a print by spraying dispersion liquid in which synthetic resin particles are dispersed in high-volatile organic solvent (solvent) prevents the print from being disappeared or dissolved into water and that the protective layer is excellent in quick-drying property and gives no bad influence on a substrate material. Then, the inventors have completed the present invention based on the aforementioned facts.

According to the present invention, a protective agent for protecting a print formed on a printing object includes a high-volatile organic solvent as a dispersion medium and non-water family high polymer emulsion liquid including synthetic resin particles as a dispersoid.

By applying the protective agent onto a print such as water-based ink print or oil-based ink print and then drying it, a protective layer including synthetic resin particles is formed on the print. As a result, the print can be effectively prevented from being disappeared or dissolving into water. In other words, the print will never be worn off even if the surface of the protective layer is touched or rubbed with a hand, and the print will never be carried away even if water is adhered to the surface of the protective layer. Furthermore, since the protective agent is liquid in which synthetic resin particles are dispersed in a high-volatile organic solvent, the protective agent is excellent in quick-drying property because a large amount of organic solvent can volatilize through the gaps among the synthetic resin particles when the protective agent is applied onto the print by a spray method or the like. Furthermore, since the organic solvent is high-volatile, the protective agent can be dried more quickly. As mentioned above, since the protective agent can be quickly dried after the application, it is possible to effectively prevent the organic solvent from permeating through the substrate material (printing material), which can prevent bad influence on the substrate material. To the contrary, in cases where conventional resin solution including organic solvent and synthetic resin dissolved therein is used, the drying rate is very slow when the solution is applied on the printed ink because there is no gap through which the organic solvent volatilizes. This allows the permeation of the organic solvent in the substrate material, resulting in bad influence on the substrate material.

It is preferable to use toluene as the high-volatile organic solvent because further enhanced quick-drying property can be obtained.

Acrylic family resin particles can be preferably used as the synthetic resin particles because the acrylic family resin particles can further improve the adhesive strength to the print.

It is preferable that a grain size of the synthetic resin particle falls within the range of 0.3 to 5 μm because this improves the water resisting property while keeping enough quick-drying property.

It is preferable that a content by weight percentage of the synthetic resin particles in the high polymer emulsion liquid falls within the range of 15 to 20 wt %. This enables a formation of a uniform protective layer, which in turn can further improve the water resisting property.

A method for forming a protective layer for a print according to the present invention includes spraying one of the aforementioned protective agents onto the print formed on the printing object, and thereafter drying the protective agent.

With this method, since the protective agent is sprayed, a thin and uniform protective layer can be formed very easily. Furthermore, since the protective agent is sprayed, there is a merit that the protective layer can be formed on the print without causing any problem even if the printing surface includes uneven surface portions and/or curved surface portions.

Furthermore, an information storage medium on which a print protective layer is formed according to the present invention includes a first print layer of oil-based ink formed on a surface of an information storage medium, a second print layer of oil-based ink formed on at least a part of an upper surface of the first print layer, and a protective layer formed on an upper surface of the second print layer, the protective layer being formed by applying any one of the aforementioned protective agents and drying the applied protective agent.

With this information storage medium, since the protective layer is formed by the protective agent on the second print layer printing an individual information such as a personal name or a registration number, the print can be prevent from being disappeared. In other words, the print will never be worn of even if the surface of the protective layer is touched or rubbed with a hand, and the print will never be carried away even if water is adhered thereto. Furthermore, the information such as individual information is not shown by embossed projected portions but shown by the thin second print layer through the thin protective layer. Therefore, even if a plurality of information storage media are placed one on another, they will not become bulky, resulting in an easy-to-store medium or easy-to-carry medium.

It is preferable that the second print layer is formed by a sublimation hot-printing method and that the protective agent is applied by a spray method. The printing by the sublimation hot-printing method can create a clear print with a simple device, and this printing method is a popular method employed by popular printers for general personal computers. Furthermore, individual information such as personal information can be printed instantly at a window in a hospital or the like by using a printer for personal computers, and the subsequent formation of the protective layer can be performed by spraying and drying the protective agent in a very short time. Accordingly, there is an advantage that printing of the required personal information or the like can be individually made on the spot in a short time.

BEST MODE FOR CARRYING OUT THE INVENTION

Figure 1:
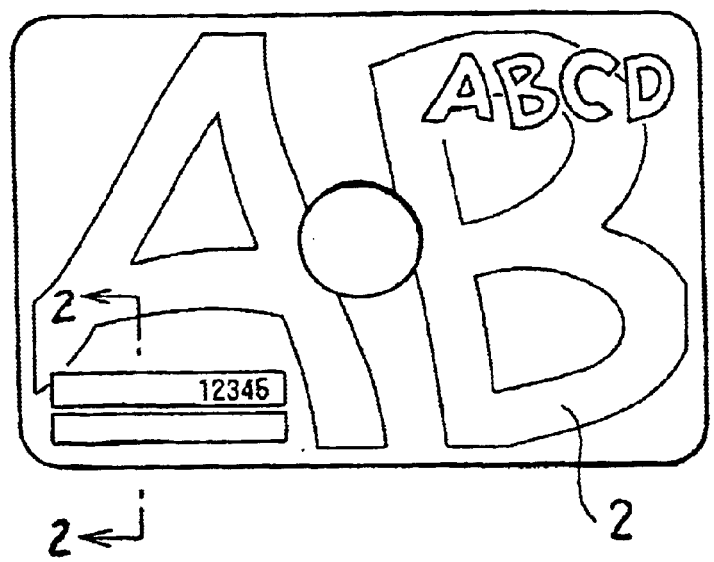
FIG. 1 is a top view showing an information recording medium according to an embodiment of the present invention.

The protective agent according to the present invention is an agent for protecting a print (water-based printed ink, oil-based printed ink, etc.) formed on a printing object, and includes a high-volatile organic solvent as a dispersion medium and non-water family high polymer emulsion liquid including synthetic resin particles as a dispersoid.

When the protective agent according to the present invention is applied onto a print by a method such as a spray method and then dried, a protective layer including synthetic resin particles is formed on the print. Therefore, the print will never be worn off even if the surface of the protective layer is touched or rubbed with a hand, and the print will never be carried away even if water is adhered to the surface.

Furthermore, since the protective agent is liquid that synthetic resin particles are dispersed in a high-volatile organic solvent, the protective agent is excellent in quick-drying property because a large amount of organic solvent can volatilize through the gaps among the synthetic resin particles when the protective agent is applied onto the print by a spray method or the like. Furthermore, since the organic solvent is high-volatile, the protective agent can be dried more quickly. Since the protective agent can be dried very quickly after the application, it is possible to effectively prevent the organic solvent from permeating through the substrate material (printing material), which can prevent bad influence on the substrate material. Accordingly, even in cases where the substrate material is an information storage media such as an optical disk, e.g., a CD, a CD-R and a card-shaped optical disk, it is possible to prevent the organic solvent from reaching the recording layer as a main portion of the information storage media. Therefore, the print can be protected without giving bad influence on the recorded information on the information storage media.

As for the aforementioned high-volatile organic solvent, although it is not specifically limited to a specific one, toluene and acetone can be exemplified. Especially, it is preferable to use toluene since toluene is excellent in quick-drying property.

As for the synthetic resin particles, although the particles are not specifically limited to a specific one, acrylic family resin particles and polyester family resin particles can be exemplified. Especially, it is preferable to use acrylic family resin particles since they can further improve the adhesive strength and can form a protective layer excellent in uniformity. As commercially available emulsion liquid containing acrylic family resin particles, "XA-4401B" (acrylic copolymerization resin family emulsion liquid made by "Kabushiki Kaisha TOUPE"), "XA-3747" (acrylic copolymerization resin family emulsion liquid made by "Kabushiki Kaisha TOUPE" can be exemplified.

It is preferable that the grain size of the synthetic resin particle falls within the range of 0.3 to 5 μm. It is not preferable that the grain size is less than 0.3 μm because the drying rate deteriorates. Also, it is not preferable that the grain size exceeds 5 μm because the water resisting property deteriorates.

It is preferable that the content by weight percentage of the synthetic resin particles in the high polymer emulsion liquid falls within the range of 15 to 20 wt %. If it is less than 15 wt %, a non-uniform protective layer may be formed and it will be required to apply the emulsion liquid plural times to form the protective layer. To the contrary, if it exceeds 20 wt %, a non-uniform protective layer may be formed and it becomes difficult to form a uniform protective layer. Furthermore, it becomes difficult to obtain a stably distributed emulsion liquid.

The high polymer emulsion liquid may contain various additives such as ultraviolet absorber, emulsifier (surfactant, etc.), binder, plasticizer and antistatic agent. As the aforementioned plasticizer, DBP (dibutyl phthalate), DOP (di-2-ethylhexyl phthalate), DIDP (diisodecyl phthalate) can be exemplified.

In cases where the ultraviolet absorber is added, the color fade-out of the print due to ultraviolet rays can be prevented effectively. Furthermore, in cases where the emulsifier is added, the distribution stability of the high polymer emulsion liquid can be improved. Furthermore, in cases where the binder is added, the adhesion of the protective layer to be formed to the print can be improved.

The method of forming the protective agent layer on a print according to the present invention is not limited to a specific one, and a spray method, a bar coater method and a roll coater method can be exemplified. It is preferable to form the protective layer by a spray method because the method can make the protective layer very easily and can make a thin and uniform protective layer.

The coating of the protective agent by the aforementioned spray method is usually carried out by using a container such as a spray can in which the protective agent is enclosed together with high pressure gas. The inner pressure of the container is preferably set to 0.34–0.42 MPa. Although the high pressure gas is not limited to a specific one, DME (dimethyl ether) and LPG can be exemplified.

Although the number of times of spraying the protective agent to the print by the spray method is not limited, it is preferable to perform the spraying multiple times in order to form a uniform protective layer.

The protective agent and the protective layer forming method according to the present invention are applied to a print, such as a water-based printed ink and an oil-based printed ink, printed on a printing object. As the printing object, an information storage medium such as a CD, a CD-R, a card-shaped optical disk, an IC card, a CD-I C card (a card equipped with a CD recording portion and an IC recording portion) and a magnetic-stripe card, or a regular paper can be exemplified. However, the printing object is not limited to one of the above.

Next, an information storage medium according to one embodiment of the present invention will be explained with reference to the attached drawings. The information storage medium 1, which is a card-shaped optical disk shown in FIGS. 1–3, comprises a transparent synthetic resin plate such as a polycarbonate resin plate, an information recording region formed on the resin plate and a reflective layer 20 consisting of a metal thin film such as an aluminum film.

A first print layer 2 formed with oil-based ink is formed on the upper surface of the reflective layer 20. The first print layer 2 is generally formed by an offset printing method or a silk printing method, and often shows color patterns, photographs, characters, etc. At the lower left half portion of the card-shaped information storage medium 1, two white belt-like portions are formed in parallel by the first print layer 2, and individual information such as personal information, e.g., an individual name or a registration number, is further printed on the white belt-like portions.

Figure 2:
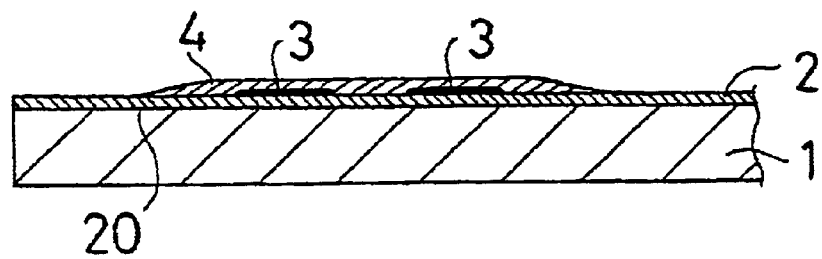
FIG. 2 is a cross-sectional view taken along the line A—A in FIG. 1.
Figure 3:
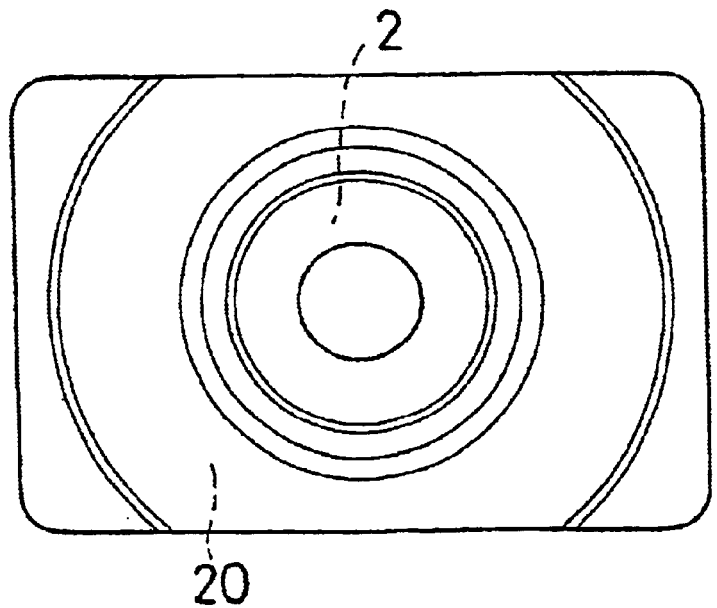
FIG. 3 is a bottom view showing the information recording medium according to the embodiment.

Namely, on the upper surface of the white belt-like portion of the first print layer 2, a second print layer 3 is formed by printing personal information, etc. with oil-based ink. In this embodiment, a member number is printed on the upper portion and an individual name is printed on the lower portion. Furthermore, the protective layer 4 is formed on the upper surface of the second print layer 3 by applying the aforementioned print protective agent thereon and then drying it. As shown in FIG. 2, this protective layer 4 is formed so as to cover the second print layer 3 and therearound. Of course, the protective layer 4 may cover the entire upper surface of the information storage medium 1.

Since the protective layer 4 formed with synthetic resin particles is formed on the second print layer 3 on which an individual information, etc. is printed, the print will never be worn off even if the surface of the protective layer is touched or rubbed with a hand, and the print will never be carried away even if water adhered to the surface.

Although the second print layer 3 may be printed by any known method, it is preferable to form the layer by a sublimation hot-printing method because this method enables to make a clear printing with a simple apparatus such as a printer for personal computers.

The configuration of the information storage medium 1 according to the present invention is not limited to the card-shape as shown in the aforementioned embodiment. The configuration may be a common disk shape (round shape), a polygonal shape, a floral shape or any other shape. Furthermore, the kind of the information storage medium 1 is not limited to a specific one, and may be, for example, an optical disk such as a CD and a CD-R, an IC card, a CD-IC card, a magnetic-stripe card, etc. Although the application of the information storage medium 1 according to the present invention is not limited to a specific one, the information storage medium 1 can be, for example, a member card, a medical-application card, a medical examination card, a cash card, a credit card, a business card and a special limited CD.

Next, concrete examples of the present invention will be explained.

EXAMPLE 1

The high polymer emulsion liquid (acrylic system resin particles were dispersed in a toluene solvent) including 20 weight parts of acrylic system resin particles with a grain size of 0.3 to 1 $\mu$m, 78 weight parts of toluene and 2 weight parts of plasticizer (DBP) was put into a metal spray can, and DME was enclosed therein so that the container internal pressure became 0.38 MPa (emulsion liquid/DME=54.75 g(60 mL)/59.25 g(90 mL)).

Then, using the aforementioned protective agent spray can, spraying were performed several times onto a water-based ink print formed on an upper surface of a CD-R in which record information had been already written. Thereafter, the coating was naturally seasoned to form a protective layer. Thus, a specimen was obtained.

EXAMPLE 2

A specimen was obtained in the same way as Example 1 except that a high polymer emulsion liquid including 15 weight parts of acrylic family resin particles with a grain size of 5 $\mu$m, 83 weight parts of toluene and 2 weight parts of plasticizer (DOP) was used as a high polymer emulsion liquid.

Comparative Example 1

A specimen was obtained in the same way as Example 1 except that a resin solution in which 20 weight parts of acrylic family resin was dissolved in 78 weight parts of ethanol was used in place of the high polymer emulsion liquid.

Comparative Example 2

A commercially available print seal was adhered on an upper surface of a CD-R in which record information had been already written, and a water-based ink print was formed thereon. Thus, a specimen was obtained.

Reference Example

A specimen having no protective layer was prepared as a reference example.

The following evaluations were performed to each specimen obtained as mentioned above. These results are shown in Table 1.

Evaluation of Drying Time

A time required for the solvent to be volatilized and completely dried was measured. The completion of drying was confirmed by touching the surface of the print with a hand.

Evaluation of Influence on a Recording Layer

After the formation of the protective layer, the recorded information on the CD-R was read out. As a result, it was evaluated as: "no influence" when the recorded information was read out as it is, and: "influenced" when a part or all of the record information was influenced or disappeared.

Evaluation of Water Resisting Property

When 15 seconds was passed after water had been dropped on the print of each specimen, the water was wiped off with a cloth. After the wiping of the water, it was evaluated as: "◎" when there was no change in the state of the print; "○" when the print could be read although there was a slight change in the state of the print; "×" when there was a heavy change in the state of the print and the print was illegible; and "××" when the print was disappeared.

EXAMPLE 3

The high polymer emulsion liquid (acrylic system resin particles were dispersed in a toluene solvent) including 20 weight parts of acrylic system resin particles with a grain size of 0.3 to 1 μm, 78 weight parts of toluene and 2 weight parts of plasticizer (DBP) was put into a metal spray can, and DME was enclosed therein so that the container internal pressure became 0.38 MPa (emulsion liquid/DME=54.75 g(60 mL)/59.25 g (90 mL)).

On the other hand, after forming a color printing (a first print layer) of drawings, etc. by an offset printing method on an entire upper surface of a card-shaped optical disk, as shown in FIG. 1, a member number and an individual name were printed at a left lower portion of the optical disk by a sublimation hot-printing (a second print layer) with oil-based ink using a printer for common personal computers. Furthermore, after spraying the protective agent onto the printed portion (several times) using the aforementioned protective agent spray can, the protective agent was naturally seasoned to form a protective layer, thereby obtaining an information storage medium. The drying time was about 15 seconds.

EXAMPLE 4

A specimen was obtained in the same way as Example 3 except that a high polymer emulsion liquid including 15 weight parts of acrylic family resin particles with a grain size of 5 μm, 83 weight parts of toluene and 2 weight parts of plasticizer (DOP) was used as a high polymer emulsion liquid. The drying time was about 15 seconds.

Comparative Example 3

A specimen was obtained in the same way as Example 3 until the second print layer was formed. In the specimen, no protective layer was formed.

The following evaluations were performed to each specimen obtained as mentioned above. The results are shown in Table 2.

TABLE 1

|  | EXAMPLE 1 | EXAMPLE 2 | COMPARATIVE EXAMPLE 1 | COMPARATIVE EXAMPLE 2 | REFERENCE EXAMPLE |
|---|---|---|---|---|---|
| Drying time | 15 seconds | 15 seconds | 20 minutes | — | — |
| Influence on CD-R recording layer | No influence | No influence | No influence | Influenced | No influence |
| Water resisting property | ◎ | ◎ | X | X X | X X |

As will be clear from Table 1, in Examples 1 and 2 in which the protective agent of the present invention was used, the protective agent was quickly dried and could protect the print without giving any bad influence on the recorded information and was excellent in water resisting property. To the contrary, in Comparative Example 1, the drying rate was slow and the protective layer was inferior in water resisting property. Furthermore, in Comparative Example 2, the protective layer was extremely inferior in water resisting property, and the protective agent gave bad influence on the record information of the information storage medium.

Evaluation of Print State

After rubbing several times with a hand, it was evaluated as: "○" when there was no change in the state of the print; "Δ" when the print could be read although there was a slight change in the state of the print; "×" when there was a heavy change in the state of the print and the print was illegible; and "××" when the print was disappeared.

Waster Resisting Property Evaluation

This evaluation was performed in the same manner as mentioned before.

TABLE 2

|  | EXAMPLE 3 | EXAMPLE 4 | COMPARATIVE EXAMPLE 3 |
|---|---|---|---|
| EVALUATION ON PRINT STATE | ○ | ○ | X X |
| EVALUATION ON WATER RESISTING PROPERTY | ◎ | ◎ | X X |

As will be apparent from Table 2, in Examples 3 and 4, the protective agent was quickly dried and excellent in water resisting property. To the contrary, in Comparative Example 3, the print was easily worn off when the print was rubbed with a hand and inferior in water resisting property.

This application claims priority to Japanese Patent Application Nos. 2000-206785 filed on Jul. 7, 2000 and 2000-367309 filed on Dec. 1, 2000, the disclosure of which is incorporated by reference in its entirety.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

INDUSTRIAL APPLICABILITY

As mentioned above, according to the protective agent of a print of the present invention, since a protection layer including synthetic resin particles is formed on a print when applying the protective agent onto the print, the print will not be disappeared even if the protective layer is rubbed with a hand or water is adhered thereto, and the protective agent is excellent in quick-drying property. Accordingly, the protective agent can be preferably used for protecting a print formed on a surface of a printing object such as an information storage medium including an optical disk, e.g., a CD (compact disk) and a card-shaped optical disk, or a regular paper.

What is claimed is:

1. A protective agent for protecting a print formed on a printing object, said protective agent comprising:
    nonaqueous system high polymer emulsion liquid including a high-volatile organic solvent as a dispersing medium and acrylic family resin particles with a grain size of 0.3 to 5 $\mu$m as a dispersoid.

2. The protective agent for protecting a print as recited in claim 1, wherein said high-volatile organic solvent is toluene.

3. The protective agent for protecting a print as recited in claim 1, wherein a content by weight percentage of said synthetic resin particles in said high polymer emulsion liquid falls within the range of 15 to 20 wt %.

4. A method for forming a protective layer for a print, the method comprising:
    spraying said protective agent according to claim 1 onto said print formed on said printing object; and thereafter drying said protective agent.

5. An information storage medium on which a printed-ink protective layer is formed, said information storage medium comprising:
    a first print layer (2) of oil-based ink formed on a surface of an information storage medium (1);
    a second print layer (3) of oil-based ink formed on at least a part of an upper surface of said first print layer (2); and
    a protective layer (4) formed on an upper surface of said second print layer (3), said protective layer (4) being formed by applying said protective agent according to claim 1 and drying said applied protective agent.

6. The information storage medium as recited in claim 5, wherein said second print layer (3) is formed by a sublimation hot-printing method and wherein said protective agent is applied by a spray method.

7. The information storage medium as recited in claim 6, wherein said high-volatile organic solvent of said protective agent is toluene.

8. The information storage medium as recited in claim 5, wherein a content by weight percentage of said synthetic resin particles in said protective layer falls within the range of 15 to 20 wt %.

* * * * *